United States Patent [19]

de Paolis

[11] 4,296,141

[45] Oct. 20, 1981

[54] CONCHLESS HIGH PROTEIN CHOCOLATE FLAVORED COMPOSITION AND METHOD OF MAKING SAME

[76] Inventor: Potito U. de Paolis, 131 Groverton Pl., Los Angeles, Calif. 90024

[21] Appl. No.: 69,857

[22] Filed: Aug. 27, 1979

[51] Int. Cl.$^3$ .......................... A23G 1/00; A23D 5/00
[52] U.S. Cl. .................................... 426/613; 426/615; 426/631; 426/660
[58] Field of Search .............. 426/613, 533, 631, 615, 426/659, 660

[56] References Cited

U.S. PATENT DOCUMENTS

| | | | |
|---|---|---|---|
| 2,353,308 | 7/1944 | Joffe | 426/659 X |
| 3,851,070 | 11/1974 | Sessoms et al. | 426/613 X |
| 3,976,806 | 8/1976 | Ziccarelli | 426/613 |
| 4,017,645 | 4/1977 | Ziccarelli | 426/613 |
| 4,042,721 | 8/1977 | Ziccarelli | 426/613 |
| 4,086,370 | 4/1978 | Olds et al. | 426/613 |
| 4,151,308 | 4/1979 | Ziccarelli | 426/613 |

OTHER PUBLICATIONS

Charalambous, G. et al. "Flavor of Foods and Beverages," Chemistry and Technology, Academic Press, N.Y., 1978, pp. 86-87.

*Primary Examiner*—Robert A. Yoncoskie
*Attorney, Agent, or Firm*—I. Morley Drucker

[57] ABSTRACT

The invention is directed to a method of making a conchless chocolate-flavored confectionary coating and composition and to the products resulting therefrom. This is accomplished by the use of 3-40 parts, by weight, of a soya protein isolate as the main emulsifier in combination with: (a) 10-65 parts by weight, edible fats (such as hydrogenated cottonseed or soybean oils); (b) 40-70 parts, by weight, sweeteners, i.e., sugar or sugar substitutes, such as corn flour, tapioca flour, or corn syrup solids; and (c) 2-60 parts, by weight, chocolate flavorings, such as cocoa or carob, plus trace amounts of other flavoring agents.

The edible fats (less a hold-back of 40-50%) sugar or sugar substitutes, flavorings and emulsifier are admixed (except for a substantial portion of the fat) to form a paste. The paste is extruded, between a series of stainless steel paired rollers to form a smooth, homogeneous but very viscous, paste of the order of 45-60 McMichael viscosity. Blended into the resulting extruded viscous paste are the balance of the fats to form a liquified blend. The liquified blend is then heated to between about 110° F.-140° F. for about 10-30 minutes under agitation, and then passed through an extruder, cooled, cut into chips, and packaged, for later use by manufacturers as a confectionary coating, or directly admixed with fruits, nuts, etc. to form a confectionary bar.

8 Claims, No Drawings

CONCHLESS HIGH PROTEIN CHOCOLATE FLAVORED COMPOSITION AND METHOD OF MAKING SAME

BACKGROUND OF THE INVENTION

Many confectionaries are coated with a flavored candy coating. The coating helps to preserve the confectionary, imparts a desired eye-appeal and adds flavor. Bakery produced cakes, ice cream bars and popsicles, candy pieces and candy bars are conventionally coated with such flavored coatings. While these coatings can be flavored with any desired natural or artificial flavor, they are most often flavored with cocoa or chocolate liquor to form a chocolate flavored coating.

Chocolate coatings can be produced in the traditional way of making milk chocolate. This process, however, requires a rather expensive ingredient, i.e., cocoa butter. For this reason and for other reasons, milk chocolate candy coatings are relatively expensive and are not used on popularly priced confectionaries and in lieu thereof a compound coating is used. Compound coatings do not require a cooking step and are, generally speaking, simply a mechanical mixture of principally cocoa, sugar and fat.

As can be appreciated, the solid ingredients and the fat of a compound coating must be so intimately mixed that the texture, mouth feel and taste of the compound coating will approximate that of milk chocolate. The process wherein these ingredients are mixed to that required extent is referred to in the art as the conching step. As is well known in the art, conching must pulverize the sugar, cocoa and other ingredients to the point that the compound coating has no "gritty" texture or mouth feel and to the extent that the cocoa is mechanically worked into the fat.

Traditionally, the conching step takes place on a "concher" which operates with rolling pressure to slowly grind and pulverize the sugar, cocoa and other ingredients into the fat.

Also, during the conching step, the moisture content of the ingredients is reduced to very low levels, i.e., to 3% or less and more often to 0.5 percent or less. Water sensitive emulsifiers, such as lecithin, are usually added near the end of the conching step when the moisture content has been reduced to the range of these lower levels.

The time required to complete a conching step of the foregoing nature will depend upon the quality of the compound coating desired. For better compound coatings up to 80 to 85 hours on the concher are required and even for the very poor and generally unacceptable grades of compound coatings, at least 8 hours will be required. The conching operation requires extended amounts of power and extended use of relatively expensive capital equipment.

The patents to Zicarelli, U.S. Pat. Nos. 4,017,645 and 4,042,721, teach a method of making a chocolate coating for confectionary purposes, which method considerably reduces the conventional conching times hitherto considered necessary. Zicarelli requires the use of relatively short conching periods but at high temperature conditions, i.e., above 150° F. for a critically short period of time of about 30 seconds or less. Obviously, Zicarelli does not eliminate the conching step, and the heavy capital and energy outlay associated therewith. Further, Zicarelli's method introduces a possible problem of deterioration of fats or cocoa or other flavorings used due to overheating. The Zicarelli patents represent the most pertinent art known to the applicant.

It is a major object of this invention to completely eliminate the need for conching of a confectionary coating—and to accomplish this by means of careful selection of the ingredients of the final coating. It is a further object of this invention to provide a coating which can truly be designated as a "health food" coating in that relatively high protein ingredients are employed, sucrose sugar is preferably not added to the formulation, the formulation is cholesterol-free, caffeine-free and of relatively low caloric content.

SUMMARY OF THE INVENTION

The invention is directed to a method of making a conchless chocolate-flavored confectionary coating and composition and to the products resulting therefrom. This is accomplished by the use of 3–40 parts, by weight, of a soya protein isolate as the main emulsifier in combination with:

(a) 10–65 parts by weight edible fats* (such as hydrogenated cottonseed of soybean oils);

*Oils are included within the definition of edible fats. Fats having a m.p. of between about 80° F. and 140° F. are preferred for use in my composition.

(b) 40–70 parts, by weight, sweeteners, i.e., sugar or sugar substitutes, such as corn flour, tapioca flour, or corn syrup solids; and (c) 2–60 parts, by weight, chocolate flavorings, such as cocoa or carob (and trace amounts of other flavoring agents, such as salt, vanilla, etc.).

Between about 5–40 parts, by weight, of the edible fats, sugar or sugar substitutes, flavorings and emulsifier, are initially admixed (i.e. a substantial portion of the fat is held in abeyance) to form a paste. The paste is extruded, between a series of stainless steel paired rollers to form a smooth, homogenous but very viscous, paste of the order of 45–60 McMichael viscosity. Blended into the resulting extruded viscous paste are the balance of the fats to form a liquified blend. Thus, the balance of the fats added increases the fat content to between 10–65 parts, by weight.

The liquified blend is then heated to between about 110° F.–140° F. for about 10–30 minutes under agitation, and then passed through an extruder, cooled and cut into chips, and packaged, for later use by manufacturers as a confectionary coating, or directly admixed with fruits, nuts, etc. to form a confectionary bar.

It has been found, surprisingly, that the emulsifying capacity of the soya protein isolate is so great, with or without the use of any additional emulsifiers such as lecithin, in the particular confectionary formulation ranges set forth above, that conching may be completely eliminated while, at the same time, the resulting composition has the taste, texture and mouth feel of a fully conched compound coating.

The confectionary chocolate composition preferably contains sweeteners derived from corn solids or tapioca flour—to avoid the introduction of sucrose sugar into the formulation. The composition contains 10 to 30% fat when a fudge topping is desired and 30 to 65% fat when a chocolate coating is desired.

DETAILED DESCRIPTION OF THE INVENTION

The chocolate confectionary formulation, for conchless processing, requires the following classes of ingredients and ranges:

| | PARTS BY WEIGHT |
|---|---|
| A. Edible fats; | 10–65 |
| B. Sweeteners - preferably corn syrup solids, corn flour or tapioca flour; | 40–70 |
| C. Chocolate flavorings - preferably carob powder; and | 2–60 |
| D. Soya protein isolate emulsifier. | 3–40 |
| TOTAL | 100 |

The preferred fats or oils employed are selected from one or more of the following: palm kernel oil (not hydrogenated) cottonseed oil (hydrogenated) and partially hydrogenated soy bean oil.

While sucrose sugar may be employed as a sweetener, it is preferred to employ a sweetener derived from corn solids such as corn syrup solids or corn flour having a dextrose equivalent of 20–25% by weight of tapioca flour, or combinations thereof.

The preferred flavoring for chocolate is carob powder (obtained from the pod of the locust tree) rather than cocoa powder. Vanilla, banana and other flavors may also be used, of course, as modifiers. Carob has 7% fat and 42–48% natural sugar (but no caffeine) while cocoa contains up to 23% fat and 5% natural sugar (and has caffeine) Since carob has such a high content of natural sugar, its use does not require as much refined sugar or sugar substitutes for sweetening.

The emulsifier employed to effectuate the purpose of this invention is a soya protein isolate. Supro 620 (manufactured by Ralston Purina Company, St. Louis, Missouri 63177) is the specific soya protein isolate of choice. Lecithin may also be added, in small amounts, of up to about 1.75 parts, by weight, per 100 parts of the ingredients of classes A, B, C and D set forth above. Lecithin is employed as an additional emulsifier but is not necessary. Soya protein isolates are well known as nutritional food supplements and as oil-in-water emulsifiers.

The fats, sweeteners, and some of the flavorings are admixed together with soya isolate, all within the stated ranges (except for a hold-back of 40–60% of fat) to form a viscous paste. The paste is then passed between stainless steel rollers which refines the mixture. The resultant mixture is extruded, as a viscous paste, which is then blended with the remaining fats, and heated to between 110° F. and 140° F. for 10–30 min. to achieve a liquified blend, under agitation. The balance of the flavorings, if any, are then added.

The resultant blend is then cooled and extruded in a long strip or ribbon form, chopped up into small chips and packaged for later use by a manufacturer as a coating, or in admixture with fruits, nuts, etc. as a health food bar.

Specific examples of the method of making my coating follow.

EXAMPLE 1

The following ingredients are measured out:

| | PARTS BY WEIGHT |
|---|---|
| Corn flour (80–90% solids content) | 46.41 |
| Palm Kernel Oil (not hydrogenated) | 37.75 |
| Carob Powder | 6.19 |
| Soya Protein Isolate | 9.28 |
| Lecithin | 0.37 |

All the ingredients except the lecithin and 15 parts of the palm kernel oil are admixed in a high speed blender, until the mixture has the consistency of a paste.

This paste is passed through five stainless steel refiners which further refine the mixture and extrude it as a very smooth but viscous paste*. At this point, the balance of palm kernel oil is added, as well as the lecithin. The paste is mixed in small ribbon blenders to reduce it to a liquid state that is heated to 140° F. and held for about 15 minutes under agitation. This liquid is fed onto a moving rubber conveyor belt, cooled, and extruded as a long ribbon.

\* of about a 50 McMichael viscosity.

Cooling is achieved by passing the liquified mix through a cooling tunnel where refrigerated air is circulated around it. The ribbon is cut at the end of the conveyor belt as small chips and those chips are packaged in 65# cartons.

EXAMPLE 2

Corn solids (derived from corn syrup solids or corn flour) was mixed with carob powder, soya protein isolate (in the proportions set out in Example 1) and 15 parts, by weight, of hydrogenated vegetable oil having a melting point of 100° F. and 1.5 parts, by weight, of lecithin were added and mixed to form a paste. After milling and passing through the stainless steel refiners as in EXAMPLE 1, an additional 10 parts, by weight, of hydrogenated vegetable oil was added as in EXAMPLE 1 to produce the ribbon material to be cooled in the cooling tunnel.

The total fat content constitutes about 25% of the total charge. If all the fat was added at the beginning of processing, the resulting mixture would be so low in viscosity that considerable difficulty would be experienced in achieving the desired homogeneity. With this amount of fat a fudge topping composition is achieved. While chocolate coatings have between 30 to 65 percent fat, fudge topping has only 10 to 30 percent fat.

During the mixing procedure, the fat is emulsified by the soya protein isolate and the moisture present is bound by the emulsified fat—protein so that the finished product is equivalent to that of a conched product having about a 2.0 percent moisture.

I claim:

1. A method of making a conchless chocolate composition which comprises:
   initially admixing at least the following ingredients:
   (a) 5–40 parts, by weight, edible fats;
   (b) 40–70 parts, by weight, sweetener selected from the group consisting of a sugar and a sugar substitute;
   (c) 2–60 parts, by weight, flavoring selected from the group consisting of cocoa powder and carob powder; and
   (d) 3–40 parts, by weight, of soya protein isolate;
   to form a viscous paste;
   admixing with said viscous paste additional edible fats to form a liquified admixture having a total fat content of between 10–65 parts, by weight;
   heating said liquid admixture to a temperature of between about 110° F. and 140° F. for a period of time of between about 10 and 30 minutes, under agitation; and cooling said heated liquified admixture to form said conchless chocolate product wherein said soya protein isolate acts as essentially the sole emulsifying agent for the said conchless chocolate composition.

2. The method of claim 1 wherein the sweetener is a corn flour having at least 80% corn solids and a dextrose equivalent of at least 20%, by weight.

3. The method of claim 1 wherein the initial admixture comprises:

about 6 parts, by weight, carob powder; and about 9 parts, by weight, soya protein isolate.

4. The product made by the process of claim 1.

5. The method of claim 1 wherein the viscous paste formed in said initial admixture has a McMichael viscosity of between 45-60.

6. The method of claim 1 wherein said edible fats have a melting point of between about 80° F. and 140° F.

7. A conchless chocolate composition which comprises:
(a) 10-65 parts, by weight, edible fat;
(b) 40-70 parts, by weight, sweetener;
(c) 2-60 parts, by weight, flavoring selected from the group consisting of cocoa powder and carob powder; and
(d) 3-40 parts, by weight, of soya protein isolate, admixed into the components of (a), (b), and (c) to form a homogenous mass, said soya protein isolate being essentially the sole emulsifier in said conchless chocolate composition.

8. The chocolate composition of claim 7 wherein the flavoring constitutes about 6 parts carob powder, by weight and the soya protein isolate constitutes about 9 parts by weight.

* * * * *